United States Patent [19]
Krueger et al.

[11] 4,091,972
[45] May 30, 1978

[54] FORAGE WAGON APPARATUS

[75] Inventors: Kenneth A. Krueger, Oconomowoc; Daniel R. Meyer, Barron, both of Wis.

[73] Assignee: Forage King Industries, Inc., Ridgeland, Wis.

[21] Appl. No.: 715,392

[22] Filed: Aug. 18, 1976

[51] Int. Cl.² .................................................. A01C 15/18
[52] U.S. Cl. .................................................. 222/627
[58] Field of Search ............... 222/176, 160, 502, 545, 222/561, 559, 627; 239/661, 664, 667, 670, 671, 672, 673, 677, 662

[56] References Cited

U.S. PATENT DOCUMENTS

| | | | |
|---|---|---|---|
| 1,540,165 | 6/1925 | Cytron | 222/502 X |
| 2,676,002 | 4/1954 | Wolfe | 239/664 X |
| 2,786,655 | 3/1957 | Cowsert | 239/664 X |
| 2,930,625 | 3/1960 | Kreider | 239/662 |

Primary Examiner—Stanley H. Tollberg
Attorney, Agent, or Firm—Merchant, Gould, Smith, Edell, Welter & Schmidt

[57] ABSTRACT

Improved apparatus useful in conjunction with a forage wagon to allow forage material to be removed from the wagon by dispensing it laterally toward the side of the wagon or, alternatively, to dispense the material directly out the front of the wagon to the area beneath the wagon such as in the filling of a trench silo. The improved apparatus includes a lateral feed conveyer affixed to the front end of the forage box by a removable attachment apparatus. Bottom and top collecting pans located beneath the lateral feed conveyer form a removable delivery surface and are constructed of discrete sections which are mounted on rail members for selective removal and replacement.

8 Claims, 8 Drawing Figures

FORAGE WAGON APPARATUS

BACKGROUND OF THE INVENTION

1. Field of the Invention

Dispensing apparatus useful in combination with a forage box or wagon which allows a lateral feed conveyer attached to the front of the forage wagon to be easily removed and replaced such that it may be used for lateral dispensing or may be removed to provide a dispensing opening adjacent the front portion of the wagon box to allow forage material to be dispensed directly therethrough to the area beneath the silage wagon for filling a trench silo.

2. Description of the Prior Art

Various forage or silage wagons have long been utilized in the farming trade for purposes of collecting, transporting and dispensing forage-like material. The most common type of device utilizes a stowage wagon which is attached to a wheeled chasis for transport. Typically, the stowage wagon contains a plurality of beater elements adjacent a front opening in the wagon and conveying means in the bottom of the wagon for moving the forage material forward in the wagon toward the beaters. In this manner, the forage material is moved to the front of the forage box for dispensing purposes where it is subdivided by the beaters prior to dispensing.

Existing forage wagon devices are typically utilized to dispense the forage material laterally from the front portion of the stowage box where it is removed by means of a separate conveying device into an upright silo or the like. For this purpose, a lateral feed conveyor is provided adjacent the front opening of the stowage box to convey the forage material laterally after it has been dispensed through the beater elements.

In addition to dispensing forage material to a conveyer wherein it is moved into an upright silo, farmers have long experienced the need for alternatively dispensing forage material into a trench silo which is typically located below ground level. Traditionally, forage boxes or wagons have been utilized for this purposes by reversing the direction of movement of the conveyers located in the bottom of the stowage box. The forage material is then moved rearwardly through an opening in the back of the stowage box. The forage material then drops out of the rear of the stowage box into the trench silo along which the forage wagon is driven.

Existing apparatus which is utilized for dispensing forage material into a trench silo has various disadvantages. Typically to move the material into the trench area beneath the wagon, it must be dispensed through the back opening. The front opening is blocked by the fixedly mounted lateral feed conveyer. In order to move the forage material rearwardly in the stowage box, it is necessary for the conveyers on the bottom of the stowage box to be re-configured such that they move rearwardly instead of in their conventional forward direction. This task is typically accomplished by reversing the drive gears or belts which move the stowage box conveyers. Because beater devices are not provided adjacent the rear opening of the stowage box, but only at the front opening, when forage material is dispensed rearwardly through the rear opening the material is not subdivided by beater elements. As a result, because the forage material tends to coagulate into relatively large masses, it is dispensed into the trench silo as large heaps of material. It is then necessary after the trench has been filled to rake the material in the trench to remove the large accumulations of material and provide a relatively smooth top surface to the silage heap. This task may also be accomplished by the use of a tractor which would be driven along the silage trench. This latter procedure is disadvantageous in that the mounds of accumulated silage are generally so large that a very uneven and steep contour is provided in the silage trench which must be traversed by the tractor. This uneven surface may result in the tractor being tipped which in turn may result in human injury.

SUMMARY OF THE INVENTION

The present invention is improved forage transport and distribution apparatus which may be utilized in a single piece of forage box equipment which has the dual function of dispensing silage forwardly and laterally utilizing a lateral feed conveyor, or dispensing silage forwardly directly to the area beneath the front portion of the silage box, such as is desirable in the filling of a trench silo. In the preferred embodiment of this invention a lateral feed conveyor is provided which may be attached to the front portion of a forage stowage box adjacent beater elements which may be located generally within the stowage box front opening. The lateral feed conveyer serves to move the forage material laterally toward the side of the forage box after the forage material has been subdivided by means of the beater elements. In this mode, the present apparatus may be utilized to dispense the forage material to a conveying mechanism for moving it into an upright silo or the like.

The lateral feed conveyer is attached to the forage wagon or forage box by attachment means which allow the conveyer and associated collecting pans to be selectively removed. A dispensing opening is thereby provided adjacent the lateral feed conveyer such that when the lateral feed conveyer and the associated collecting pans are removed an open area is provided which allows the forage material to be dispensed from the front opening of the stowage box directly to the area beneath the forage wagon or box.

The lateral feed conveyer comprises opposed driven chains with interspaced riffle members. The conveyer is supported on opposed support shafts which are removably journaled in support bearings. The bearings may be selectively moved to allow the conveyer to be loosened and tightened for purposes of removal and replacement from its position over the dispensing opening. A bottom pan member positioned beneath the lateral feed conveyer is constructed in two parts, each part containing a handle. Each portion of the bottom pan member is supported on opposed first and second rails which allow the pan sections to be slidably removed from their established position, thus exposing the dispensing opening beneath the lateral feed conveyer.

The first pan rail comprises a rail member having an inclined upper surface which is generally parallel to an inclined lateral edge surface provided on the bottom pan. This allows the bottom collecting pan to be self-seating with the rail member and also reduces the likelihood that the silage material will bridge the gap between the opposed pan rails when the forage material is dispensed through the dispensing opening. This apparatus allows the improved forage box or wagon to be utilized interchangeably in either a side dispensing mode wherein the lateral feed conveyer is utilized, or a front dispensing mode wherein the forage material is dispensed through the beater elements to the area beneath the forage box or wagon. The latter mode of operation allows the forage material to be evenly dispensed into a trench silo where it is further compacted and distributed by the movement of the forage wagon over the dispensed forage material. The need for dispensing rearwardly from the wagon and the relatively complex re-configuration of the drive mechanism which this entails is thereby eliminated.

DETAILED DESCRIPTION OF THE PREFERRED EMBODIMENT

Figure 1:
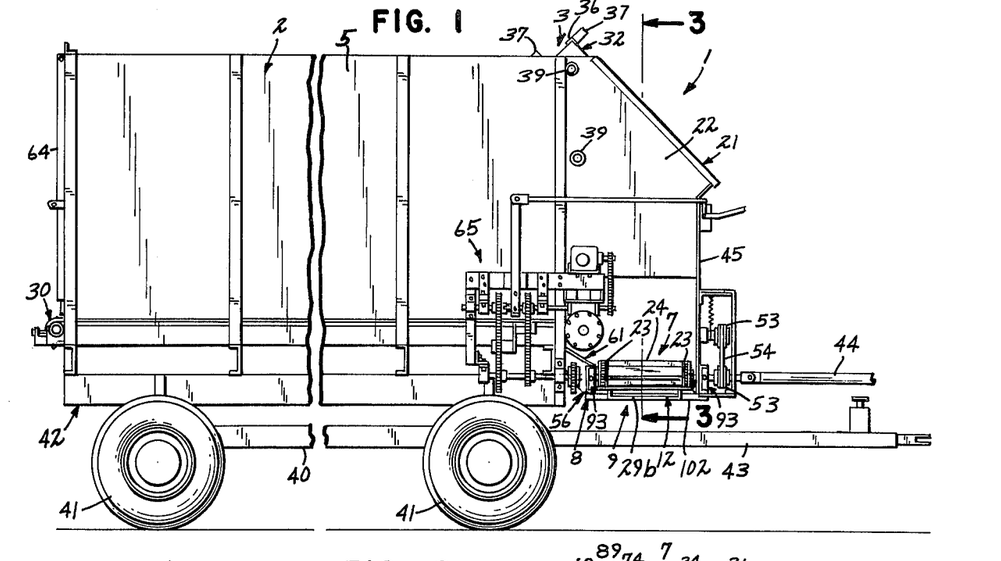
FIG. 1 is a side elevationl view of the improved silage wagon apparatus showing the lateral feed conveyer in place.

Referring to FIGS. 1-8 wherein like numerals refer to like structural elements, the present invention comprises improved forage distribution apparatus. The apparatus may be utilized in combination with various forage boxes or wagons. In the preferred embodiments, the present invention is utilized in combination with a forage wagon 1 which is of the general type having a stowage box 2 which has a front portion 3 and opposed first and second sides, 4 and 5. Stowage box 2 is provided with a front opening 6 and a rear opening 63, closed by a door member 64. The stowage box 2 and associated apparatus are shown in FIG. 1 mounted to a chassis 42 which in turn is carried on a wagon frame 40. A plurality of wheels 41 and a wagon tongue 43 may be utilized to pull apparatus 1 behind a tractor or other prime mover.

As is the case with existing forage transport apparatus, forage wagon 1 is provided with first and second chain conveyers, 30 and 31 respectively, mounted in the bottom of stowage box 2. Conveyors 30 and 31 are driven by drive apparatus 65 which is driven by drive shaft 44 which is connected to the power take-off point of the prime mover (not shown). Various methods of driving conveyers 30 and 31 may be utilized. It is primarily the purpose of conveyers 30 and 31 to move forage material which may be implaced within stowage box 2 forwardly toward front opening 6 for ultimate dispensing from the forage wagon 1. Various conveying means, different from the chain conveyers shown in the Figures, may be utilized for this purpose.

Figure 2:
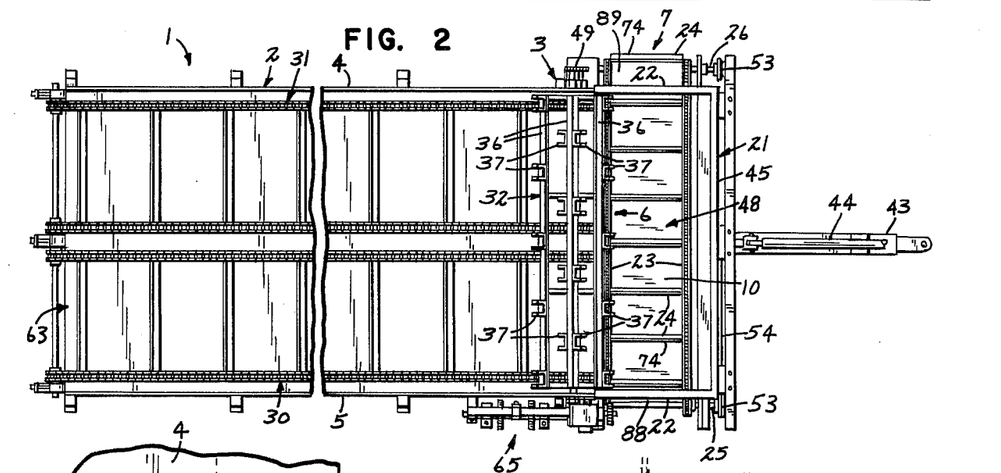
FIG. 2 is a top plan view of the improved silage wagon apparatus shown in FIG. 1.
Figure 3:
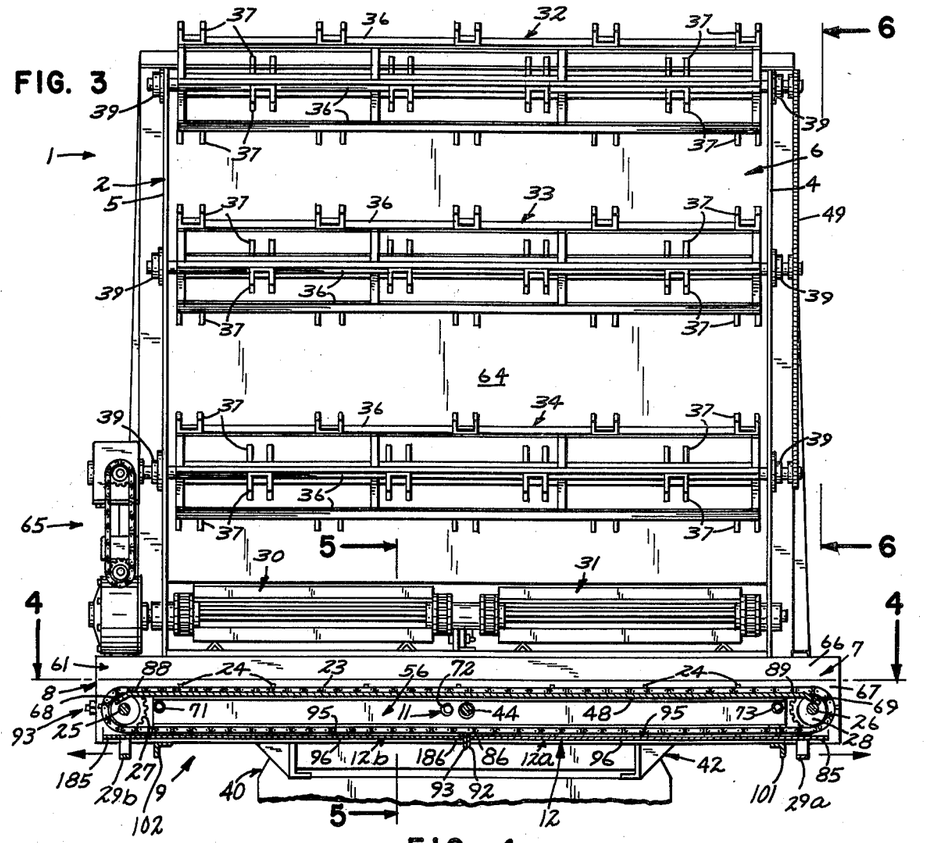
FIG. 3 is a sectional view of the improved silage wagon apparatus as seen from the line 3—3 in FIG. 1.
Figure 4:
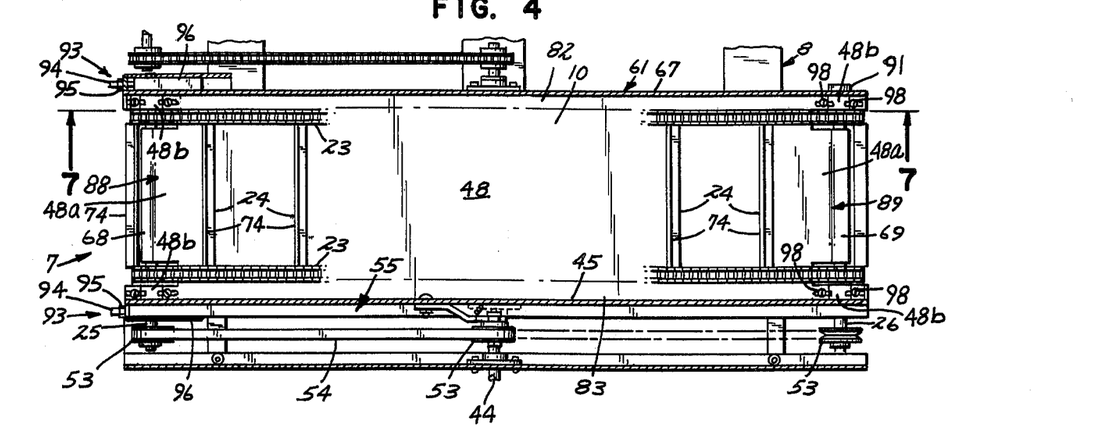
FIG. 4 is a detailed top plan view of the lateral feed conveyer shown in FIG. 3 taken along the line 4—4 in FIG. 3.

By moving the forage material through front opening 6, the forage material may be subsequently dispensed to an area where it is to be stored. Conventionally, forage material such as silage is stored in above-ground piles, in upright enclosed silos and the like, or in below-ground trenches which are commonly referred to as trench silos. For purposes of moving the forage material to an above-ground pile or to an upright silo, the forage wagon 1 generally incorporates a lateral feed conveyer 7 such as is shown in FIGS. 1-3. By moving the forage material through front opening 6 onto lateral feed conveyer 7, the material may be moved to the side of forage wagon 1 where it can then be picked up by additional conveying means (not shown) for movement to a storage pile or to an upright silo (not shown). Lateral feed conveyor 7 may be of various designs utilizing chains, belts, blades, blowers, etc., referred to herein generally as "lateral feed means".

Most forage material, such as silage, is a generally granular material comprised of various elements and containing a relatively large amount of moisture. As a result, most forage material tends to coagulate such that when it is moved, it is moved as a mass. To allow forage material to be easily dispensed from a stowage box despite its tendency to coagulate, most forage wagon apparatus includes a plurality of beater elements which serve to break up the masses of forage material for esier dispensing from the stowage box.

Figure 6:
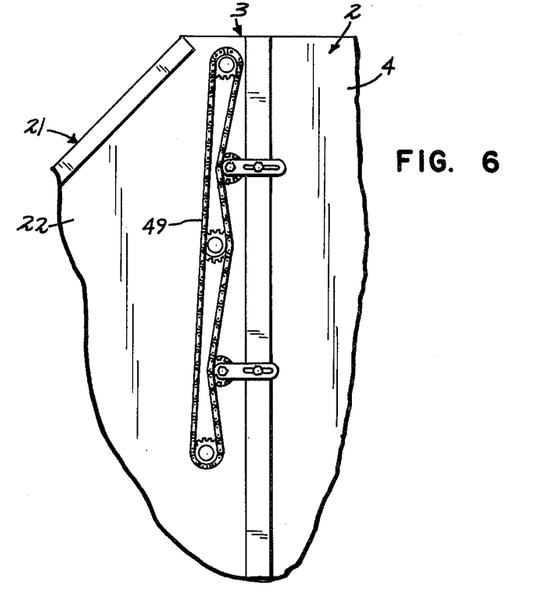
FIG. 6 is a detailed elevationl view of the beater bar drive chain as seen from the line 6—6 in FIG. 3.

Referring to FIGS. 1, 3 and 6, forage wagon 1 is provided with a plurality of beater racks (32-34) which are positioned generally adjacent front opening 6. As is shown in detal in FIG. 3, forage wagon 1 is provided with a top beater rack 32, a central beater rack 33 and a bottom beater rack 34. Beater racks 32-34 are mounted with their ends positioned in beater-support bearings, each designated by the numeral 39, which are mounted on sides 4 and 5 of stowage box 2. Each of beater racks 32-34 is comprised of a plurality of beater bars, each identified by the numeral 36, which are mounted as a unitary structure for rotation within opposed pairs of beater bearings 39. Attached to each of beater bars 36 is a plurality of beater blades, each designated by the numeral 37. When beater racks 32-34 are rotated by means of a drive chain 49 or similar device (see FIG. 6) beater blades 37 cut into the forage mass and their movement tends to break up and disseminate the forage material as it is moved into the beater racks by means of stowage box conveyers 30 and 31. As a result, the forage material is dispensed from the beater racks 32-34 as a generally continuous flow of discrete material which then may be handled in subsequent steps as a semi-fluid material.

The present apparatus allows forage wagon 1 to be utilized to dispense forage material through the front beater racks either laterally from the front portion of stowage box 2 to a subsequent conveying device where it may be lifted onto a forage pile or into an upright silo, or into a below-ground level trench silo. This is in contrast to existing apparatus wherein a trench silo is filled by moving the forage material rearwardly in the stowage box to the rear opening where it must be dispensed with out the benefit of the agitating action of beater racks. To accomplish this dual function, the present invention incorporates a delivery opening 9 adjacent the front portion of stowage box 2 and forward of front opening 6 which may be opened or closed by the removal and replacement of lateral feed conveyer 7 and associated hardware item which form additional components of the invention and which will be described in detail subsequently.

In the preferred embodiment, lateral feed conveyor 7 is removably attached adjacent the front portion of stowage box 2 by attachment means 8 which include a first attachment member 61 which is attached to a channel section 60 which forms a part of chassis 42. First attachment member 61 is comprised of an inclined upper surface 66 which serves as a feed ramp communicating between the area at the end of stowage box conveyers 30-31 and the top surface of lateral feed conveyer 7. Attached to inclined upper surface 66 is a generally vertical support surface 67 to which is mounted a first support member 56. First support member 56 and first attachment member 61 may be attached to one another by welding or other suitable means. It is the purpose of first support member 56 to serve as a support means for one side of lateral feed conveyer 7 and for a pan support rail which will be described subsequently.

Positioned adjacent front opening 6 and generally surrounding lateral feed conveyer 7 is a generally rectangular enclosure 21. Enclosure 21 is formed from opposed side panels, each designated by the numeral 22, and a front panel 45. Front panel 45 has a bottom portion to which is attached a support beam 55. Support beam 55 serves as a second support member for lateral feed conveyer 7. As is shown in detail in FIG. 5, an open area is provided between opposed support members 56 and 55 which forms a delivery opening 9 through which forage material may drop when it is dispensed through front opening 6. This open area allows forage wagon 1 to dispense its forage material directly to the area beneath and in front of the forage wagon. As a result the forage wagon may be utilized for filling a trench silo wherein the forage material is separated by means of the front beater racks 32-34 prior to its dissemination through delivery opening 9.

When forage wagon 1 is utilized to dispense forage material through the front of the stowage box and onto the lateral feed conveyer 7, the lateral feed conveyer is positioned such that it generally covers delivery opening 9. Conveyer 7 is then used to dispense forage material laterally in its direction of drive toward a selected side of stowage box 2 where it may be further distributed, such as in the filling of an upright silo. In the preferred embodiment, lateral feed conveyer 7 is comprised of opposed driven chains, each designed by the numeral 23, which form an endless conveyer circuit. Interspaced between conveyer chains 23 are a plurality of riffles 24 which include an upright element 74 which urges the forage material in the direction of movement of the conveyer. Driven chains 23 and riffles 24 form an endless conveyer which is supported on opposed ends by means of support shafts 25 and 26. As is shown in detail in FIG. 4, each of support shafts 25 and 26 are positioned generally adjacent the opposed sides of stowage box 2 and are supported in movable bearing means which will be described in detail later. First support shaft 25 contains a pair of opposed sprocket members, each designated by the numeral 27, each of which are attached to the support shaft and which have tooth elements that intermesh between the chain lengths of conveyer chains 23. In the preferred embodiment, the first support shaft 25 serves as the drive shaft for lateral feed conveyer 7. Similarly, the second support shaft 26 has opposed sprocket members, each designed by the numeral 28, located at opposite ends of the shaft which also have tooth elements to engage the chain links in driven chains 23. The second support shaft 26 serves as a support shaft for the chain conveyer. It should be noted that either of the support shafts 25-26 or either ends of chains 23 may be the drive end with the other end being the support end. Also, other appropriate conveyor designs (not shown) may also be used as lateral feed conveyer 7.

Figure 5:
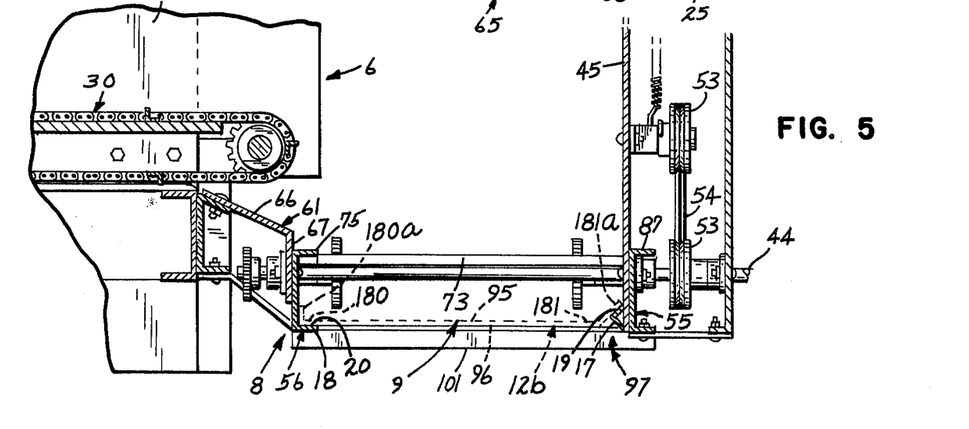
FIG. 5 is a sectional detailed view of the apparatus taken along the line 5—5 in FIG. 3.

In order to provide a delivery surface onto which the forage material may be dispensed prior to its being carried by lateral feed conveyer 7, the preferred embodiment utilizes a top collecting pan 48 which is positioned beneath chains 23 and riffles 24. As the lateral feed conveyer 7 is moved laterally, the forage material which is fed onto the top delivery surface 10 of top collecting pan 48 is moved by the riffles 24. In the preferred embodiment, collecting pan 48 is a generally flat elongated pan, having a top delivery surface 10, opposed ends 88 and 89, and opposed lateral edges 82 and 83. Opposed ends 88 and 89 have downward turned edges 68 and 69, respectively, which direct the forage material downwardly and prevent it from spilling beneath the collecting pan at its ends. Top collecting pan 48 has a tongue portion 48a at each of the opposed ends which has a narrower width than the other portions of collecting pan 12 so that these portions may be fitted between the sprockets 27 and 28 on support shafts 25 and 26. Top collecting pan 48 is supported on delivery surface support means 11 which include three support rods, designated by the numerals 71, 72 and 73, one rod being located generally adjacent each end of collecting pan 48 and one being located generally at the center of the collecting pan. As is shown in FIG. 3 the downturned edges 68 and 69 extend generally over the top portion of end support shaft 25 and 26 thereby directing the forage material of the end of the conveyer. The top edge 75 of first support member 56 serves to partially support one lateral edge of top collecting pan 48 and to prevent the spillage of forage material between collecting pan 48 and inclined surface 66. This detail is shown in FIG. 5.

Extending outwardly from each of the ends of pan 48 adjacent tongue portions 48a are connecting portions 48b. These connecting portions contain bolt holes and bolts 98 for further securing pan 48 to brackets 100 which engage bearings 50, 51 and 90, 91 to position pans 48 in place. The pan is removed by lifting brackets 100 of their respective bearing supports. By providing these support means for top collecting pan 48, it is possible to remove top collecting pan 48 from the area beneath lateral feed conveyer 7 without tools by merely lifting it, and then sliding it laterally along its support means after the chains 23 have been removed.

Positioned below lateral feed conveyer 7 is a bottom pan member 12. It is the purpose of bottom pan 12 to shield the lower flight of conveyer 7 and to also collect any forage material which may spill past the lateral feed conveyer 7. This keeps ground material from being injected upwardly into the under side of the lateral feed conveyer 7. Referring to the embodiment shown in the figures, bottom pan 12 comprises two elongated panel members 12a and 12b. Since panels 12a and 12b have similar, but opposed, structural details, a detailed description of both panels will be provided by primary reference to panel 12a. Parenthetical designations of the corresponding element of panel 12b will be provided in the description of panel 12a to allow suitable reference between the two panels. Each of members 12a and 12b have opposed top and bottom surfaces, 95 and 96, opposed first and second lateral edges, 80 (and 180) and 81 (and 181), respectively, first and second ends 85 (and 185) and 86 (and 186), respectively. Second lateral edge 81 (and 181) has an elongated up-turned portion 81a (and 181a) which forms a longitudinally extending inclined bottom surface. Lateral edge 80 (and 180) has an up-turned edge portion 80a (and 180a) which is at generally right angles to surfaces 95-96. This perpendicular edge helps prevent the spillage of forage material from the surface 95. In addition, up-turned edges 81a and 80a (and 181a and 180a) serve as strengthening "webs" which improve the longitudinal rigidity of panels 12a and 12b. Inclined edge 81a (and 181a) has an additional function which will be described later.

It is intended that when panels 12a and 12b are slideably abutted against one another, that their opposed ends 86 and 186 would abut one another. Attached to edges 86 and 186 are generally perpendicular stiffening members 92 and 93 respectively. These members have two functions. First, they tend to laterally stiffen panels 12a and 12b, and secondly they serve as catch members which prevent panels 12a and 12b from being retracted from their closed position. This feature will be described in detail later. While the preferred embodiment utilizes two separate panels 12a and 12b, in certain embodiments of the invention it may be possible to utilize a single panel or other numbers of panels.

To removably support bottom pan member 12 in its position beneath lateral feed conveyer 7, bottom pan member support means 97 are utilized which incorporate opposed first and second pan rails 17 and 18, respectively. First pan rail 17 extends laterally along the bottom edge of the front panel 45 of enclosure 21 adjacent support beam 55. First pan rail 17 has an inclined upper surface 19 which is oblique to the horizontal.

Opposite first pan rail 17 is second pan rail 18 which has a generally horizontal upper support surface 20. In the preferred embodiment, second pan rail 18 is formed as the bottom web member of first support member 56. Other appropriate means of providing rail 18 may also be utilized (not shown). It is intended that each of pan panels 12a and 12b be slidably removable from the area beneath the lateral feed conveyer 7 by sliding movement along the upper surfaces of pan rails 17 and 18.

An additional feature of the support means for the bottom pan is the upturned lateral edge 81 (181) which is formed along the length of each of pan panels 12a and 12b. Lateral edge 81 has generally the same angle of obliqueness as does upper surface 19 of first pan rail 17. This matching contouring of these two contact surfaces allows the bottom pan panels 12a and 12b to be self-seating in that the gravitational weight of the panels tends to force lateral edges 81 (181) into abutting angular contact with upper surface 19 thereby forcing the bottom pan into a seated position.

The inclined angle of upper surface 19 has another important advantage in that it has been found by the Applicant to avoid the problem of bridging of the forage material which would otherwise occur between pan rails 17 and 18 when the top and bottom pans and lateral feed conveyer 7 are removed. The inclined angle of upper surface 19 tends to prevent the adhesion of forage material to this surface and thus the bridging problem is reduced or eliminated.

Each of bottom pan panels 12a and 12b may be removed from opposite sides of forage wagon 1 by means of pan handles 29a and 29b which are affixed to each of the outside ends of panels 12a and 12b, respectively. When panels 12a and 12b are replaced beneath lateral feed conveyer 7, they are slid along pan rails 17 and 18 until their first ends abut one another to form an enclosure across the delivery opening 9.

Since panels 12a and 12b are intended to be removed when the forage apparatus is utilized for filling a trench silo, the Applicant has found that in the preferred embodiment the presence of stiffeners 92 and 93 at the adjacent ends of each of panels 12a and 12b, respectively, allow the panels to be moved laterally until the stiffeners are adjacent the support member 101, and 102 respectively located at opposed ends of lateral feed conveyer 7.

To allow lateral feed conveyer 7 to be easily removed and replaced from its area over delivery opening 9, the bearings into which support shafts 25 and 26 are inserted are movable bearings and are provided with adjustment means for selectively positioning the bearings to provide the desired tightness to the conveyor. Support shaft 25 is supported between bearings 50 and 51 and support shaft 26 is supported between bearings 90 and 91. Bearings 90 and 91 are attached to support beam 55. It is intended that bearings 90 and 91 be generally fixed in place.

Figure 7:
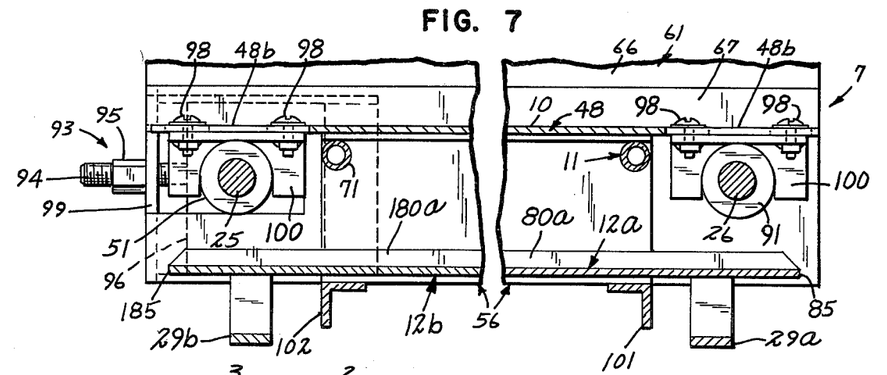
FIG. 7 is a detailed sectional view showing the mounting means utilized to support the laterl feed conveyer, taken along the line 7—7 in FIG. 4.
Figure 8:
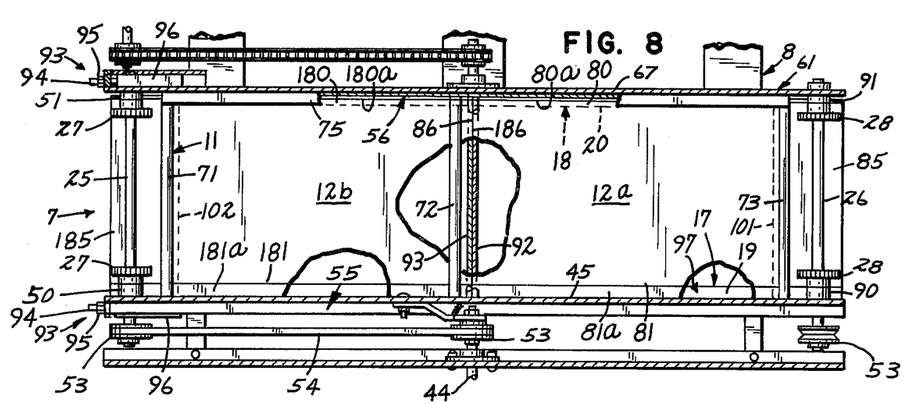
FIG. 8 is a detailed top plan view of the lateral feed conveyor support and drive mechanisms with parts thereof removed.

Support shaft 25 is supported between bearings 50 and 51, and it is intended that bearings 50 and 51 be movably mounted so that support shaft 25 may be moved laterally to allow the lateral feed conveyer 7 to be tightened and loosened at will. The adjustment means 93 which are utilized to selectively locate movable bearings 50 and 51 are shown in FIG. 7. Adjustment means 93 comprise a support member 99 which is affixed to each of support members 56 and 55. Support member 99 contains an opening through which is inserted a threaded shaft 94. A positioning nut 95 may be threaded onto threaded shaft 54 to move it. One end of threaded shaft 94 extends outwardly and a second end is attached to a support block 96 on which bearing 51 is mounted. A similar arrangement is utilized for bearing 50. Support blocks 96 are free to move in a direction to tighten conveyer 7. As threaded shafts 94 are moved, they carry support blocks 96 with them to selectively move bearings 50, 51 and support shaft 25. In this matter, bearings 50 and 51 may by selectively moved to loosen lateral feed conveyer 7 such that it may be removed for purposes of dispensing forage material through delivery opening 9, and subsequently replaced with ease. A system of pulleys 53 have a belt 54 entrained over them to drive the conveyer 7 in a desired direction of movement. One of the pulleys 53 is mounted in the power shaft 44.

The operation of the present invention may be summarized as follows. The improved apparatus is attached or utilized on a forage wagon by placing it adjacent a front opening in the stowage box. With the lateral feed conveyer in place, forage material may be dispensed from the stowage box laterally to peripheral conveying equipment. When it is desired that the forage wagon be utilized to dispense forage material into a trench silo or the like by dispensing it directly through the front opening of the stowage box and to the area beneath the forage wagon, the lateral feed conveyer and associated apparatus is removed. This is accomplished by loosening the support bearings 50 and 51 which support the chain conveyer 7. The chain conveyer is then removed. The top collecting pan is then removed by sliding it along the delivery surface support means 11. The bottom collecting pan is removed by pulling each of panels 12a and 12b laterally along the opposed pan support rails 17 and 18 until the panels 12a and 12b are removed from opening 9. This provides open access through delivery opening 9 such that forage material may be moved from the stowage box through the beater racks 32-34 and thence through the delivery opening 9 to the trench area beneath the wagon.

The present ivention also includes a method for dispensing silage or forage material from a wagon into a storage area which is directly beneath the wagon such as a trench silo. This method includes the towing or movement of a wagon or stowage box over the area into which the forage material within the stowage box is to be dispensed. After the stowage box of the apparatus has been filled with forage material or the like, the stowage box is pulled or driven along the surface to be filled. The material in the stowage box is moved forward in the box and it is subsequently broken up by means of the movement of beater racks which are positioned adjacent a front opening in the stowage box. The forage material is moved through the beater racks and through the front opening of the stowage box to the area in front of the stowage box relative to the forward direction of movement of the stowage box.

A delivery opening is provided adjacent the front opening of the stowage box, near its lower portion. This delivery opening is cleared of any obstructions by removing the lateral feed conveyor which may be present and covering it, and by the removal of any top or bottom collecting pans, or other pans or panels, which may be present and obstructing the opening. This forage material is then moved to the front of the stowage box, is moved through the beater elements, and is dispensed down through the dispensing opening to the area in front of and beneath the stowage box. The forward movement of the forage apparatus then continues with this dispensing continuing.

When the material in the stowage box has been dispensed, the stowage apparatus is configured for further loading and transport, or for subsequent lateral dispensing of material, by replacing the lateral feed conveyer. Top and bottom collecting pans, or other panels, are placed adjacent the lateral feed conveyer to support its lateral feed functions.

In a particular embodiment of this invention, the lateral feed conveyer is removed and replaced by the following steps. After the lateral feed conveyer has been in place, along with its associated collecting pans or other panels, the conveyer is removed by first removing the chains on the conveyer and then by removing the upper collecting pan. The conveyer chain is removed by loosening its support shaft or support bearings which are then moved to loosen the chain. The chain can then be removed by disengaging the coupling links on each side. The upper collecting pan can be removed by disconnecting bolts or other removable means of attachment. The lower collecting pan or similar panel is then removed by sliding it out or pulling it out from its in-place position. In certain embodiments of the invention, this is accomplished by pulling two abutting panels laterally away from one another until they are extending to the sides of the apparatus. All other mechanisms which block the dispensing opening are then also removed. The lateral feed apparatus may then be replaced by generally reversing the above-noted steps which results in the closing of the dispensing opening. This method eliminates the previously known steps of reversing the drive direction of conveyers located in the bottom of the stowage box, wherein the material was dispensed out the back of the stowage box without the use of the beaters. This also reverses the previously known method of filling a trench silo by dispensing the material out the front of the stowage box and then laterally to the side of the stowage box using the lateral feed conveyer. In that embodiment of the dispensing procedure, it was necessary that the trench silo be very wide because the material was dispensed only to the side of the wagon, or the wagon had to be driven along the edge of the trench with lateral dispensing into the trench.

What is claimed is:

1. Improved forage transport and distribution box apparatus of the type having a stowage box with a front portion and opposed sides, the stowage box containing a front opening for dispensing forage material therethrough from the stowage box, and stowage box conveying means for urging forage material through the stowage box front opening, wherein the improvement comprises:
    (a) a lateral feed conveyor for delivering forage material from the stowage box front opening to a dispensing area adjacent at least one side of the stowage box, said conveyor including a pair of spaced support shafts, and an endless conveying member carried around said support shafts;
    (b) attachment means for attaching said lateral feed conveyor adjacent the stowage box front opening with the feed direction of the conveyor directed toward the side of the stowage box;
    (c) said attachment means containing a delivery opening communicating generally between the front opening and the area directly beneath the stowage box front portion through which forage material may be dispensed from the stowage box front opening, said attachment means rotatably carrying said support shafts such that said endless conveying member is normally positioned over said delivery opening;
    (d) a delivery surface associated with said lateral feed conveyor for supporting forage material thereon during its delivery by said endless conveying member, said delivery surface being normally positioned over said delivery opening;
    (e) delivery surface support means for removably supporting said delivery surface over said delivery opening to allow said delivery surface to be selectively removed; and
    (f) means for removably mounting said endless conveying member around said support shafts to allow said endless conveying member to be selectively removed, whereby forage material may be dispensed from the front opening through the delivery opening when said delivery surface and said endless conveying member are removed.

2. The improved apparatus of claim 1 wherein:
    (a) said endless conveying member is a chain conveyer including opposed driven chains interconnected by a plurality of riffles which move with said chains and carry forage material therewith; and
    (b) said delivery surface comprises a top collecting pan positioned beneath at least a portion of said chain conveyer to cover said delivery opening and to position forage material adjacent the chain conveyer for dispensing thereby.

3. Improved forage transport and distribution box apparatus of the type having a stowage box with a front position and opposed sides, the stowage box containing a front opening in the box front portion for dispensing forage material therethrough from the wagon box, the front opening containing beater elements, and conveying means for urging forage material through the stowage box front opening, wherein the improvement comprises:
(a) a latera feed means for delivering forage material from the stowage box front opening to a dispensing area adjacent at least one side of the stowage box;
(b) attachment means for removably attaching said lateral feed means adjacent the stowage box front opening with the feed direction directed toward the side of the stowage box;
(c) said attachment means containing a delivery opening through which forage material may be dispensed from the stowage box front opening to the area beneath the front portion of said box;
(d) a bottom pan member positioned generally beneath said lateral feed means for supporting forage material that passes downwardly through said lateral feed means to a position generally below said lateral feed means; and
(e) bottom pan member support means for removably supporting said bottom pan member in a position where it generally covers said delivery opening, whereby said bottom pan member may be selectively removed from this position to expose said delivery opening.

4. Improved forage transport and distribution box apparatus of the type having a stowage box with a front portion and opposed sides, the stowage box containing a front opening in the box front portion for dispensing forage material therethrough from the wagon box, the front opening containing beater elements, and conveying means for urging forage material through the storage box front opening, wherein the improvement comprises:
(a) lateral feed means for delivering forage material from the stowage box front opening to a dispensing area adjcent at least one side of the stowage box;
(b) attachment means for removably attaching said lateral feed means adjacent the stowage box front opening with the feed direction directed toward the side of the stowage box;
(c) said attachment means containing a delivery opening through which forage material may be dispensed from the stowage box front opening to the area beneath the front portion of said stowage box;
(d) a bottom pan member positioned generally beneath said lateral feed means, said bottom pan member comprising a top surface and opposed first and second lateral edges, said first lateral edge being inclined upwardly at an oblique angle to the pan top surface; and
(e) bottom pan member support means for removably supporting said bottom pan member in a position where it generaly covers said delivery opening, whereby said bottom pan member may be selectively removed from this position to expose said delivery opening; wherein said bottom pan member is further characterized by:
(i) a first pan rail attached to said attachment means, said first pan rail having an inclined upper surface which is oriented generally parallel to said first lateral edge of the bottom pan member, thereby providing intermeshing inclined surfaces;
(ii) a second pan rail attached to said attachment means, said second pan rail containing an upper support surface for engaging the second lateral edge of said bottom pan member; and
(iii) said bottom pan member being slidably movable along the upper surfaces of said first and second pan rails to allow said bottom pan member to be slidably removable from the area beneath said lateral feed means by sliding motion along said pan rails.

5. The improved apparatus of claim 4 wherein:
(a) said bottom pan member comprises two separate panels, each panel having first and second ends, said panels being positionable adjacent one another with said first ends generally abutting one another to generally cover said delivery opening; and
(b) said pan member panels include a handle means attached to each of said panels to allow the panels to be gripped by hand and pulled laterally away from one another aong said pan rails.

6. The improved apparatus of claim 5 wherein:
(a) said lateral feed means comprise a conveyer of the type having a movable endless conveying circuit;
(b) said attachment means include first and second opposed support shafts, said shafts containing engagement devices for operably engaging said endless conveying circuit;
(c) said first shaft is mounted in movable bearings; and
(d) including adjustment means for selectively moving said movable bearings from a support position wherein said conveyer is taught, to a disengaged position wherein said conveyer can be disconnected from said attachment means and removed.

7. The improved apparatus of claim 6 wherein:
(a) said lateral feed conveyer is a chain conveyer including opposed driven chains interconnected by a plurality of riffles which move with the chains; and
(b) said lateral feed means include a top collecting pan positioned beneath at least a portion of said chain conveyer to cover said delivery opening and to position forage material adjacent the chain conveyer.

8. The improved apparatus of claim 3 wherein said lateral feed means include:
(a) a chain conveyor including opposed driven chains interconnected by a plurality of riffles;
(b) a top collecting pan forming a delivery surface positioned beneath at least a portion of said chain conveyor to cover said delivery opening when said chain conveyor is in place; and
(c) support means for removably supporting said top collecting pan and said chain conveyor over said delivery opening to allow said top collecting pan and said chain conveyor to be selectively removed, whereby said top collecting pan and said chain conveyor do not obstruct said delivery opening.

* * * * *

UNITED STATES PATENT AND TRADEMARK OFFICE
CERTIFICATE OF CORRECTION

PATENT NO. : 4,091,972
DATED : May 30, 1978
INVENTOR(S) : Kenneth A. Krueger and Daniel R. Meyer It is certified that error appears in the above-identified patent and that said Letters Patent are hereby corrected as shown below:

In column 1, line 20 for "chasis" read --chassis--.

In column 1, line 42 for "purposes" read --purpose--.

In column 3, line 23 for "elevationl" read --elevational--.

In column 3, line 26 for "laterl" read --lateral--.

In column 4, line 23 for "esier" read --easier--.

In column 6, line 30 for "of" read --off--.

In column 6, line 42 for "of" read --off--.

In column 9, line 4 for "ivention" read --invention--.

In column 11, line 5 for "latera" read --lateral--.

In column 12, line 23 for "aong" read --along--.

Signed and Sealed this

Twenty-first Day of November 1978

[SEAL]

Attest:

RUTH C. MASON
Attesting Officer

DONALD W. BANNER
Commissioner of Patents and Trademarks